Feb. 26, 1946.  J. ANDERSON  2,395,652
STORAGE BATTERY
Filed Feb. 16, 1943  2 Sheets-Sheet 1
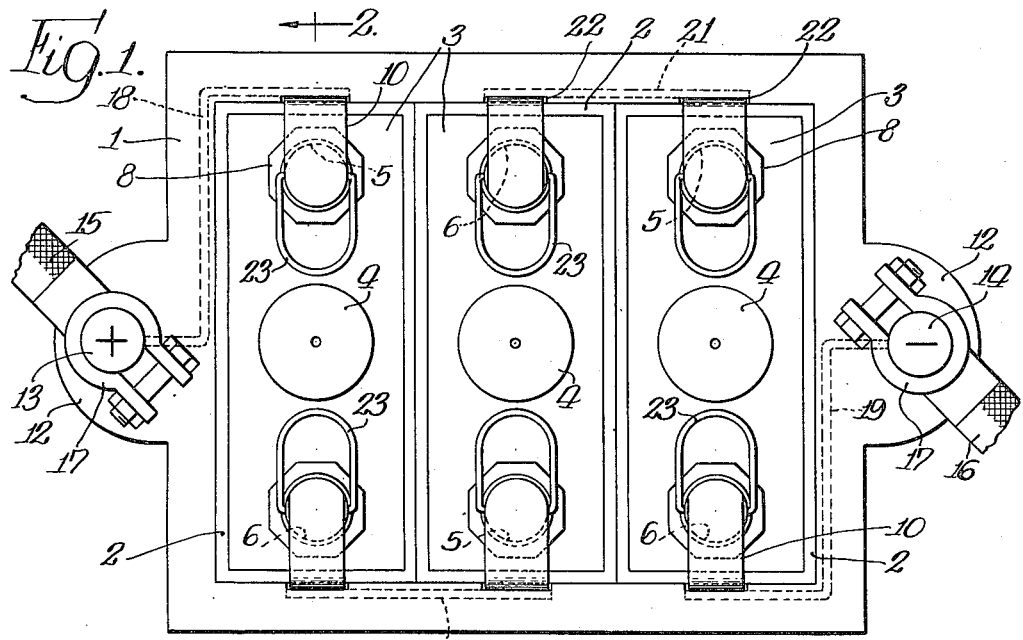
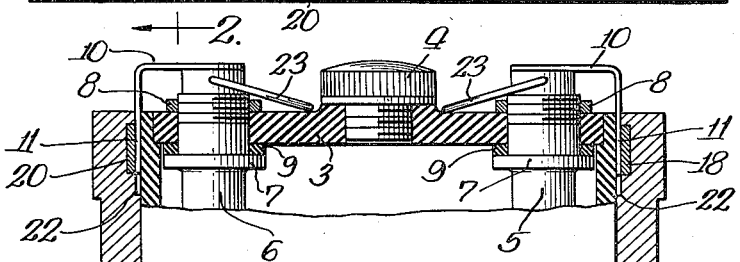
INVENTOR.
John Anderson,
BY Osgood H. Dowell
Atty.

Feb. 26, 1946.   J. ANDERSON   2,395,652
STORAGE BATTERY
Filed Feb. 16, 1943   2 Sheets-Sheet 2

INVENTOR.
John Anderson,
BY Osgood H. Dowell
Atty.

Patented Feb. 26, 1946

2,395,652

UNITED STATES PATENT OFFICE 2,395,652

STORAGE BATTERY

John Anderson, Chicago, Ill.

Application February 16, 1943, Serial No. 476,079

3 Claims. (Cl. 136—166)

The object of this invention is to provide an improved storage battery comprising individually replaceable cells or battery units. Among other specific objects, the invention has in view the provision of a construction whereby all electrical connections are made by placing the set of battery cells in the battery box, each cell being removable and electrically disconnectable by lifting it out and being replaceable and reconnectable electrically by dropping it into its place.

A storage battery embodying the invention may comprise any desired number of cells. In the accompanying drawings, there is shown for illustration a storage battery of one practicable construction comprising three 2-volt cells; the particular storage battery selected for illustration being designed for use in a motor vehicle for supplying current for the lighting system and for operation of the engine starter and for initial ignition.

In the drawings:

Fig. 1 is a top plan view of the illustrative storage battery.

Fig. 2 is a cross-section taken on the line 2—2 of Fig. 1, looking in the direction of the arrows, one of the battery cells being shown partly in section and partly in side elevation.

Corresponding parts in the several figures of the drawings are indicated by similar reference numerals.

Figure 3:
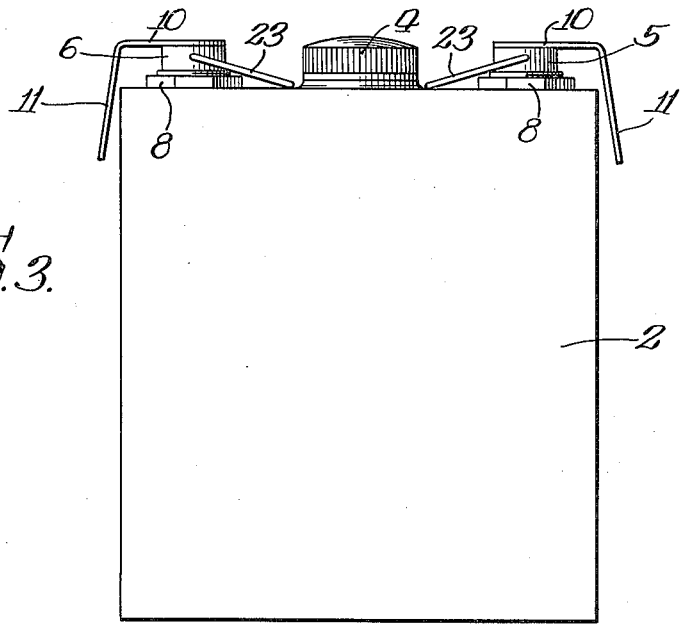
Fig. 3 is a side elevation of an individual cell removed from the battery box.
Figure 4:
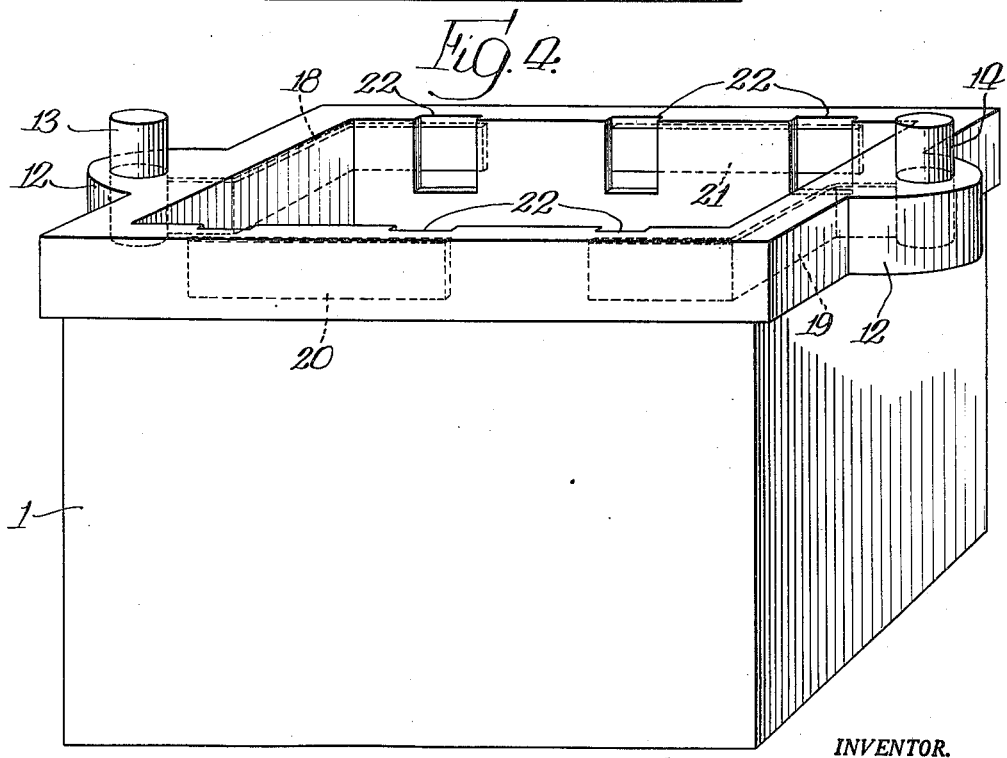
Fig. 4 is a perspective view of the battery box.

As shown in the drawings, the battery box or case 1, which is molded from hard rubber or other suitable insulating material, contains and supports a set of battery cells 2 arranged side by side in a row with the ends of the cells adjacent to the side walls of the box, the assembled cells being fitted in the box fairly snugly but with sufficient looseness to allow ready withdrawal and reinsertion of individual cells.

Each cell constitutes in itself a complete battery unit comprising a liquid-holding case containing a pair of electrodes and a suitable electrolyte. The cell cases, to which are applied the reference numerals 2, are shown as box-like receptacles of rectangular form closed by tops 3 fitted in the rabbeted upper ends of said receptacles and cemented in place. The cell cases and tops thereof are molded from hard rubber or other suitable insulating material. In the cell tops are filler openings through which to pour acid or liquid into the cell cases, such openings being closed by removable screw caps 4.

Cell electrodes are represented by metallic posts 5 and 6, those for each cell being suitably supported within the cell case and projecting up through and fixed to the top 3 thereof. As shown in Fig. 2, said posts 5 and 6 are formed with shoulders 7 and with screw-threaded portions engaged by nuts 8 bearing against the cell top 3 which is thus clamped between said shoulders and nuts, rubber gaskets 9 being interposed between said shoulders 7 and the under side of the cell top.

Internally the cells may be of conventional character, it being understood that within each cell case the electrodes 5 and 6 are respectively formed or provided with grids consisting of parallel lead plates, those of one cell electrode being arranged between or in alternation with those of the other cell electrode and the two sets of plates being separated by spacers of wood or other suitable material, all submerged in the acid or liquid which constitutes the electrolyte. These features are not shown as they are old and well known in the art.

Affixed rigidly to the upper ends of the cell electrodes in electrical connection therewith are contactors 10 consisting of resilient sheet metal strips, preferably of brass. These contactor strips 10 may be secured to the flat tops of the electrodes by brazing, welding or by any suitable means. Said strips extend to or slightly beyond the planes of the end faces of the cell cases and have downwardly bent extensions 11. When a battery cell is removed from the battery box, said downwardly bent extensions 11 of its contactors 10 are sprung outwardly, as shown in Fig. 3.

The battery box 1 is shown formed with end lugs 12 in which are embedded upwardly projecting metallic studs or binding posts 13 and 14 constituting the battery terminals. Insulated wires or conductors 15 and 16 of the circuit in which the battery is included can be connected to said metallic studs or binding posts by any suitable means as, for example, metallic clamps 17 unitary with said conductors and clamping said metallic studs or binding posts 15 and 16.

Embedded in the walls of the battery box are a number of conductors consisting of metallic strips, preferably of brass. Two of these brass strips, 18 and 19, are embedded in the opposite end walls of the battery box and have extensions embedded in the opposite side walls thereof, said brass strips or conductors 18 and 19 being respectively connected electrically with the battery terminals constituted by the metallic studs or binding posts 15 and 16. Other brass strips or conductors 20 and 21 are embedded in and extend longitudinally of the opposite side walls of the battery box. It will be observed that the brass strips or conductors in one side of the battery box are arranged in alternation with or in staggered relation to those in the opposite side of the battery box. The number of such conductors depends upon the number of battery cells. In a battery of three cells, there are four conductors in the battery box. A battery of four cells would require five such conductors; one of five cells would require six such conductors, and so on, every cell which may be added to the battery requiring an additional conductor.

In the opposite side walls of the battery box are vertical grooves 22 arranged to receive the downwardly bent extensions 11 of the contactors 10 affixed to the cell electrodes. Said grooves 22 extend downwardly from the top surfaces of the side walls of the battery box, the grooves being of appropriate widths for engagement of the contactor extensions 11 therein and being otherwise of appropriate dimensions to accommodate said extensions. The brass strips 18, 19, 20, and 21 cross the grooves 22, said brass strips being at the backs of said grooves, as will be readily understood from Fig. 2. Each groove 22 is crossed by only one of the brass strips, and each of the brass strips 20 and 22 crosses two of said grooves. When the battery cells are in the battery box, the contactor extensions 11 engaging the brass strips are bent straight down as shown in Fig. 2, so that they bear with spring tension against the brass strips. To insert a battery cell in the box, its contactor extensions 11 are pressed inwardly by the fingers and engaged in the appropriate grooves 22 therefor, whereupon the cell can be lowered or dropped into place.

As will be apparent from Fig. 1, the battery cell nearest the battery terminal 13 has the contactor on its electrode 5 in contact with the conductor 18 leading from said terminal, and the contactor on its other electrode 6 in contact with the conductor 20 with which also contacts the contactor on the electrode 5 of the second cell. The other electrode 6 of said second cell is connected by its contactor to the conductor 21 to which is similarly connected the electrode 5 of the third cell. Said third cell has its other electrode 6 similarly connected to the conductor 19 leading to the battery terminal 14. Thus the several cells are electrically connected in series between and with the battery terminals, each cell having a pole of one sign connected to a pole of the opposite sign of the next cell. Assuming that the battery is being charged and considering the binding post 13 as the positive terminal, the charging current will flow from said terminal through the conductor 18 to the positive pole 5 of the first cell; from the negative pole 6 of said first cell through the conductor 20 to the positive pole 5 of the second cell; from the negative pole 6 of said second cell through the conductor 21 to the positive pole 5 of the third cell; and from the negative pole 6 of said third cell through the conductor 19 to the negative battery terminal 21. In the use of the charged battery, the flow of current is of course in the opposite direction.

The several cells are similar, individually removable and replaceable, and interchangeable. When in the use of the battery any cell becomes defective or in need of recharging, it can be readily removed and replaced by another or recharged and reinserted. Each cell is electrically disconnected by lifting it out, and the electrical connections for its opposite ends are reestablished by reinserting it. All electrical connections of the cells with one another and with the battery terminals are made automatically by the placing of the cells in the battery box. Hence the removal and replacement of the cells does not entail the necessity of manipulating fastenings for disestablishing and reestablishing electrical connections.

The contactors affixed to the cell electrodes 5 or the downwardly bent extensions of such contactors may be somewhat wider than those affixed to the cell electrodes 6, and the vertical grooves in the side walls of the battery box to receive the contactor extensions of said electrodes 5 may be correspondingly wider than the other grooves, so that the grooves to receive the contactor extensions of the electrodes 6 will not admit those of the electrodes 5; whereby to insure positioning of the cells in the battery box with the cell electrodes connected with the proper conductors. In lieu of this feature, the cell electrodes 5 and box grooves to receive the extensions of the contactors affixed to said electrodes could be marked with corresponding indicia.

The electrodes of the battery cells are shown provided with pivoted bails 23 which normally lie against the cell tops but which can be swung up to vertical position and grasped as handles for conveniently lifting out the cells and for holding them while lowering them into place. In lieu of said bails, any appropriate handle means could be provided.

The invention thus provides a storage battery of very advantageous and convenient character, and one also of simple and practicable construction and susceptible of economical manufacture.

Obviously the invention is not limited to the particular embodiment shown and described.

I claim as my invention:

1. A storage battery comprising an open-topped cell supporting case of insulating material, a set of individually removable and interchangeable cells fitted therein and supported thereby, said cells being arranged side by side in a row with the cell ends adjacent to opposite side walls of the case, each cell having adjacent to its ends resilient outwardly sprung contactors fixed to the cell electrodes, battery terminals comprising binding posts embedded in the opposite ends of the case, and conductors embedded in said side walls of the case and contacted by said contactors, said conductors being arranged for connecting said cells in series and the set of cells to said terminals the cells being removable and replaceable by lifting them from and lowering them into the case and all electrical connections of the cells with one another and the terminals being made by placing the cells in the case, the set of cells being removable without disturbance of circuit connections with said terminals.

2. A storage battery comprising a case of insulating material, a set of cells fitted therein, said cells being arranged side by side in a row with the cell ends adjacent to opposite side walls of the case, the cell electrodes being adjacent to the cell ends, contactors fixed to the cell electrodes and projecting to or beyond the planes of the end faces of the cells and having resilient outwardly sprung portions, vertical grooves in the side walls of the case arranged to receive said outwardly sprung portions of said contactors, and conductors embedded in the case, each groove being crossed by one of such conductors arranged at the back of the groove and so as to be contacted by the contactor engaging in said groove, said conductors connecting the cells in series, the cells with their attached contactors being individually removable and replaceable.

3. A storage battery comprising a case of insulating material, a set of cells fitted therein, said cells being arranged side by side in a row with the cell ends adjacent to the side walls of the case, the cell electrodes being adjacent to the cell ends, contactors fixed to the cell electrodes and projecting to or beyond the end faces of the cells and having resilient outwardly sprung portions, vertical grooves in the side walls of the case arranged to receive said outwardly sprung portions of said contactors, and conductors embedded in the case, each groove being crossed by one of said conductors arranged at the back of the groove and so as to be contacted by the contactor engaging in said groove, said conductors connecting the cells in series, certain of said conductors in opposite sides of the case being each contacted by contactors of non-corresponding electrodes of adjacent cells, the other conductors being each contacted by one contactor of a cell at an end of the row, and battery terminals connected to the last mentioned conductors, the cells with their attached contactors being individually removable and replaceable.

JOHN ANDERSON.